US012644847B2

(12) United States Patent     (10) Patent No.:   US 12,644,847 B2

Shen et al.     (45) Date of Patent:    Jun. 2, 2026

---

(54) SINGLE-PASS 3D RECONSTRUCTION OF INTERNAL SURFACE OF PIPELINES USING DEPTH CAMERA ARRAY

(71) Applicant: NUtech Ventures, Lincoln, NE (US)

(72) Inventors: Zhigang Shen, Lincoln, NE (US); Zhexiong Shang, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 110 days.

(21) Appl. No.: 18/839,342

(22) PCT Filed: Feb. 17, 2023

(86) PCT No.: PCT/US2023/062818

§ 371 (c)(1),
(2) Date: Aug. 16, 2024

(87) PCT Pub. No.: WO2023/159180

PCT Pub. Date: Aug. 24, 2023

(65) Prior Publication Data

US 2025/0164412 A1     May 22, 2025

Related U.S. Application Data

(60) Provisional application No. 63/311,312, filed on Feb. 17, 2022.

(51) Int. Cl.
    *G01N 21/954*      (2006.01)
    *G01N 21/88*       (2006.01)
    *G06T 7/80*        (2017.01)

(52) U.S. Cl.
    CPC ....... *G01N 21/954* (2013.01); *G01N 21/8806* (2013.01); *G01N 21/8851* (2013.01); *G06T 7/85* (2017.01); *G01N 2021/9544* (2013.01); *G01N 2021/9548* (2013.01); *G06T 2207/10028* (2013.01)

(58) Field of Classification Search
    CPC ............ G01N 21/954; G01N 21/8806; G01N 21/8851; G01N 2021/9544; G01N 2021/9548; G06T 2207/10028
    See application file for complete search history.

(56) References Cited

U.S. PATENT DOCUMENTS

2013/0321589 A1* 12/2013 Kirk ........................ G06T 17/00
                                         348/47
2015/0350506 A1* 12/2015 Olsson ................. G03B 37/005
                                         348/84
2020/0174129 A1* 6/2020 Abdelkader .......... B60B 19/006

OTHER PUBLICATIONS

U.S. Patent and Trademark Office, International Search Report in International Patent Application No. PCT/US2023/062818, 3 pp. (May 7 9, 2023).
U.S. Patent and Trademark Office, Written Opinion in International Patent Application No. PCT/US2023/062818, 3 pp. (May 7 9, 2023).

* cited by examiner

*Primary Examiner* — Georgia Y Epps
*Assistant Examiner* — Don J Williams
(74) *Attorney, Agent, or Firm* — Leydig, Voit & Mayer, Ltd.

(57) ABSTRACT

A system for inline inspection of a pipeline where the system includes: an inline vehicle to transport the system along the pipeline; a depth camera array (DCA) of multiple RGBD cameras located on an end of the vehicle, circular lights attached around the cameras to illuminate inside the pipeline, and a controller connected to the DCA.

17 Claims, 12 Drawing Sheets

Camera Array

Different types of pigs

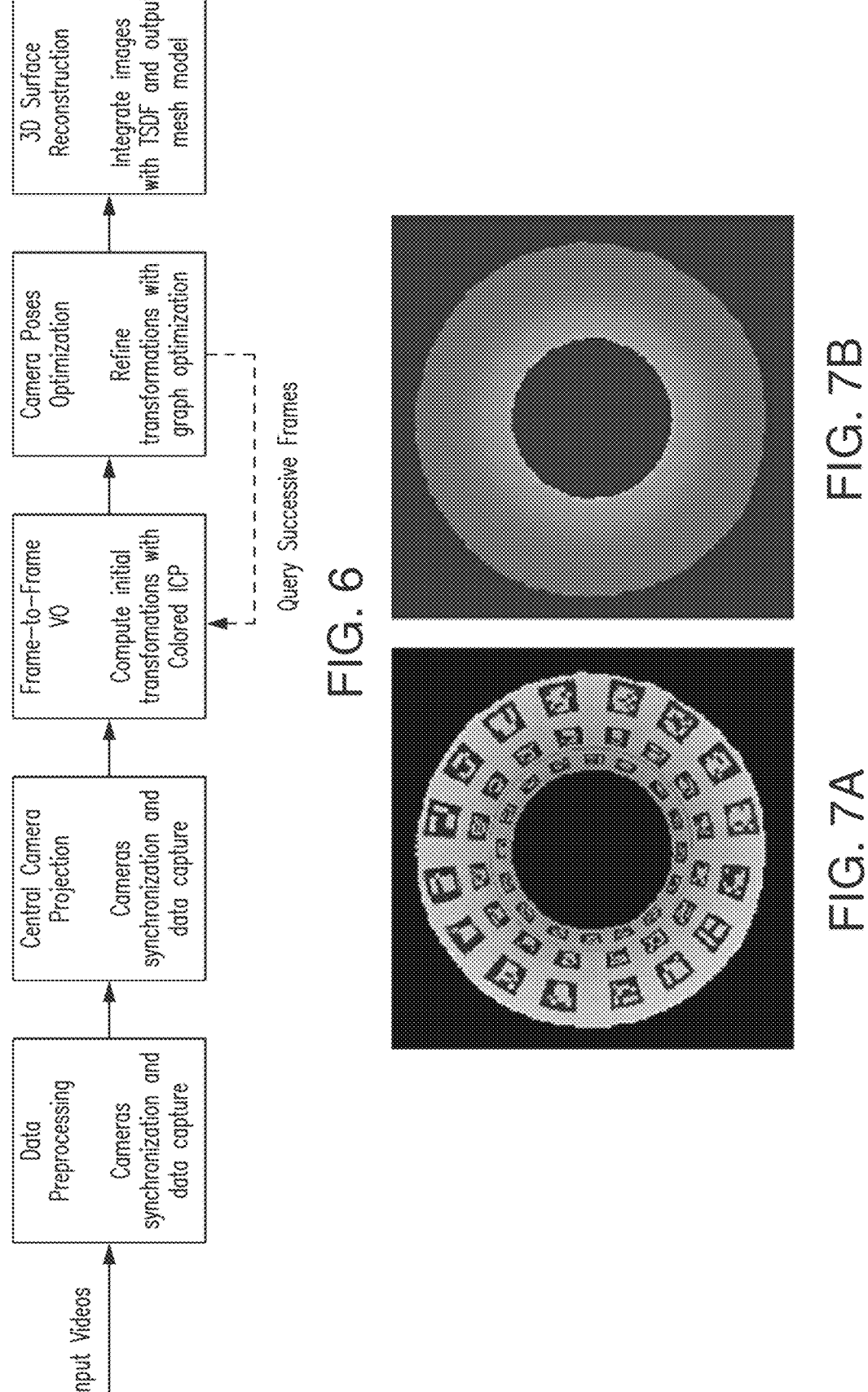

Input Videos

Data Preprocessing

Cameras synchronization and data capture

Central Camera Projection

Cameras synchronization and data capture

Frame-to-Frame VO

Compute initial transformations with Colored ICP

Query Successive Frames

Camera Poses Optimization

Refine transformations with graph optimization

3D Surface Reconstruction integrate images with TSDF and output mesh model

SINGLE-PASS 3D RECONSTRUCTION OF INTERNAL SURFACE OF PIPELINES USING DEPTH CAMERA ARRAY

CROSS-REFERENCE TO RELATED APPLICATIONS

This patent application is a national stage filing of International Application No. PCT/US2023/062818, filed Feb. 17, 2023, which claims the benefit of U.S. Provisional Patent Application No. 63/311,312, filed Feb. 17, 2022, each of which is incorporated herein in its entirety and for all purposes by reference.

STATEMENT REGARDING FEDERALLY SPONSORED RESEARCH OR DEVELOPMENT

This invention was made with Government support under 693JK31850013CAAP awarded by the United States Department of Transportation. The Government has certain rights in the invention.

FIELD OF THE DISCLOSURE

The present disclosure relates to pipe inspection systems and methods and, more particularly, to a three dimensional (3D) reconstruction of the internal surface of pipelines using cameras.

BACKGROUND OF THE INVENTION

Pipelines are essential infrastructures for transporting energies throughout the nation. Per the U.S. Energy Information Administration (EIA), there are more than 2.6 million miles of transmission and gathering pipelines in the United States, supporting about 34% of the annual energy consumption of the country. Although pipelines are considered to be the safest and the most cost-effective way to deliver the energy (as opposed to the tanker trucks and freight trains), integrity failures of pipelines often cause catastrophic losses. Per the statistics from the Pipeline & Hazardous Materials Safety Administration (PHMSA), there were over 12,500 reported pipeline incidents between 2001 and 2020, resulting in over 280 fatalities at a cost of approximately $US 10 billion. In practice, pipeline integrity can be negatively affected by many factors, including excavation damage, structural or material failures caused by aging, and/or by the static or dynamic stresses from the surrounding environment, severe temperature fluctuations, soil movements, floods, etc. Thus, periodic inspection is needed to maintain the integrity and service life of the pipelines.

In-line inspection involves use of technologically advanced tools such as robots, which traverse the length of a pipe internally. These robots, which are sometimes also referred to as pigs, are deployed inside a pipeline and can move along the full length of the pipeline. Once deployed, the pig can perform contact testing, inspections and sample collections from inside the pipeline body. It is also used to record data such as the wall thickness and dents as it moves through the pipeline.

BRIEF SUMMARY OF THE INVENTION

Accurate and dense reconstruction of 3D pipeline models can help pipeline operators detect many types of pipeline defects and better assess the pipe conditions. Due to the potential sparsity of surface features on the internal pipeline walls and the scale ambiguity, 3D pipeline reconstruction using monocular structure-from-motion approach remains a challenging task. In the present disclosure, a novel inline inspection (ILI) approach using depth cameras array (DCA) is introduced to create high-fidelity, dense 3D pipeline models. A key contribution of this research is a proposed new camera calibration method to non-rigidly register the color and the depth information of the cameras into a unified pipe model. By incorporating the calibration outcomes into a robust camera motion estimation approach, dense and complete 3D pipe surface reconstruction is achieved by using only the inline image data collected by a self-powered ILI rover (or other suitable vehicle) in a single pass through a straight pipeline. The outcomes of the laboratory experiments demonstrate one-millimeter geometrical accuracy and 0.1-pixel photometric accuracy. In the reconstructed model of a longer pipeline, the proposed method generates the dense 3D surface reconstruction model at the millimeter level accuracy with less than 0.5% distance error. The achieved performance highlights its potential as a useful tool for efficient in-line, nondestructive evaluation of pipeline assets.

BRIEF DESCRIPTION OF THE SEVERAL VIEWS OF THE DRAWINGS

FIG. 6 is a flowchart for a method in accordance with the disclosure.

FIGS. 7(a) and 7(b) are illustrations of images in accordance with the disclosure.

DETAILED DESCRIPTION OF THE INVENTION

Figure 1A:
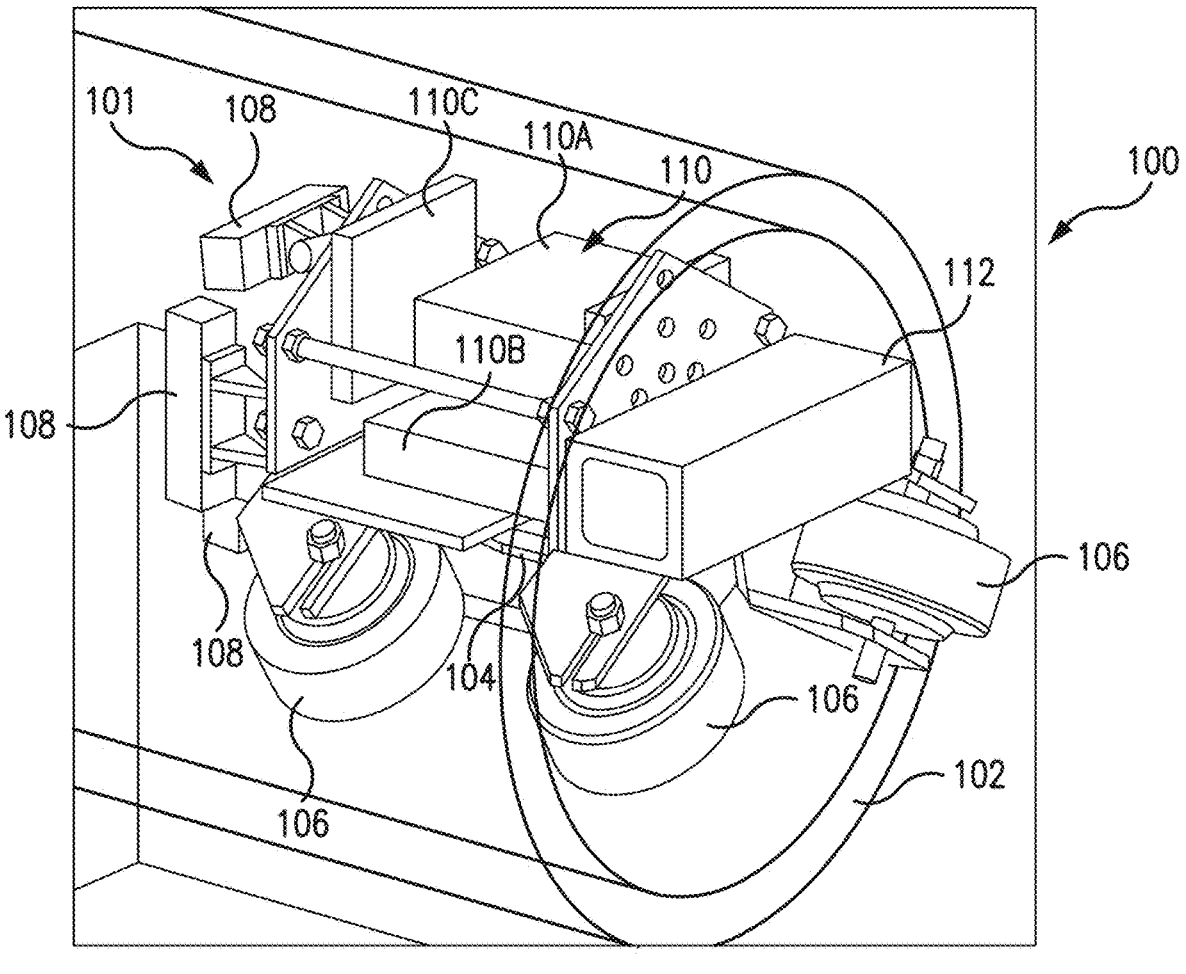
FIG. 1A is a schematic view of a system in accordance with the disclosure.

Pipeline inspection involves the techniques of detecting and locating the pipe's inherent defects, such as deformation, corrosion, pitting, cracks etc. Modern pipe inline inspection (ILI) and nondestructive evaluation (NDE) were often carried out by pipeline inspection gauges, also known as 'smart pigs'. During the inspection, the pigs move slowly inside pipelines and measure the irregularity on the surface using onboard sensors. The most common sensors installed on the pigs for ILI purposes are magnetic flux leakages (MFL), ultrasonic transducers (UT) and eddy current testing (ECT). However, most of these NDE sensors are configured for detecting one specific type of defects in each inspection. In addition, the pigs are often large and heavy and can only be used in the later generation pipelines that were specifically designed to allow the pig's operation. Older or legacy pipelines still account for a large portion of the operating pipelines, whose service conditions often need more frequent assessments. Currently, there is a lack of effective and efficient ILI tools to acquire the pipeline condition data for comprehensive assessments.

Following the advancements in optical sensors, visual inspection has gained significant attention in the last decade. By mounting a rotatable camera system on a robotic rover, video data of the pipe's internal surfaces can be obtained while the rover moves across the pipe. The collected videos are then processed with the image processing and machine learning algorithms to identify the pipe's defects. While the RGB camera has the advantage of being low-cost and capturing rich information compared to other NDE sensors, the RGB camera data is largely limited to capturing 2D textures of the pipe internal surface. For example, the small bulges and deflections of the buried pipes are often not detectable from single images. Recently, image-based 3D reconstruction has been recognized as a viable tool to better assess the pipeline defects such as visible cracks, corrosion, pitting, bending, and holes. It involves the techniques of detecting and matching features between the adjacent images, finding the correspondences for image triangulation, optimizing the camera poses as well as the 3D points through bundle adjustment (BA), and recovering the model geometry through surface reconstruction. To reconstruct a full pipeline model using small number of images, front-viewed omnidirectional vision sensors (e.g., fisheye camera, catadioptric camera) were often used. By sequentially registering the obtained images, the internal surfaces of the pipe walls can be recovered in high-level details.

Despite the progress, the monocular sensor-based techniques often suffer from challenging illuminating conditions, the sparsity of the surface features, and the scale ambiguity of the structure-from-motion (SfM). To address the issues, some proposed solutions use a strategy to assume that the pipeline geometries are known based on the original pipeline designs. One disadvantage of such previously proposed solutions, however, is that the assumed prior knowledge of the pipeline geometrics in the design stage often do not match the as-builts, and often do not match the actual conditions after the pipeline's decades of exposure to underground geotechnical forces.

The proliferation of depth cameras in robotic applications creates opportunities to address the limitations of the monocular camera in ILI. In addition to RGB image data, depth cameras can acquire direct measurements of the object's distance at the pixel level. Typical depth cameras include the time-of-flight (ToF), structured light, and stereo triangulation. In recent years, the reduced cost and improved performance of depth camera sensors make them applicable in ILI. While existing studies have developed varied in-pipe inspection systems using depth cameras (such as the front-viewed stereo system, the verged stereo system, and the trinocular system), the reconstructed models either were too sparse and noisy, or only covered a partial of the pipe, or required heterogeneous textures being painted across the pipe wall.

Up to now, complete, dense, and accurate 3D reconstruction of pipelines through a single-pass inspection remain a challenging task.

To overcome the identified challenges, the present disclosure describes a system and method that employs a uniquely designed depth camera array (DCA) for ILI 3D pipeline reconstruction. The disclosed systems and methods present various advantages over existing systems and methods, including that the developed oblique-view DCA overcomes the major limitations present in the prior art; the new camera array layout ensures the full surface coverages with sufficient point density while keeping a minimal number of cameras. In addition, the systems and methods in accordance with the disclosure include a calibration method, which allows the registration of multiple (e.g., four) oblique depth cameras into a unified pipe model at approximately one millimeter level accuracy. Compared to the existing depth cameras calibration methods that use a moving checkerboard to capture a sequence of overlapped images, this new calibration method does not require overlapped coverage among each camera. In addition, only one shot is required from each camera at each time step, which significantly reduces the overall computational cost. Further, a fused RGBD video generated from the four oblique RGBD cameras is used for DCA motion estimation. Unlike the state-of-the-art monocular SfM techniques, the new method does not require prior geometric knowledge of the inspected pipelines for motion estimate. This method also outperforms the recently developed laser profiling technique because it allows the image data being acquired at much higher traveling speed (~1 m/s) along the pipelines.

In the description that follows, related work, the hardware of the ILI system and the design choice of the onboard cameras, the proposed calibration method for the DCA, an automated approach for 3D pipeline reconstruction, an experimental setup and the evaluation results, and key findings and suggestions are presented.

With respect to related work, there have been extensive studies about inline pipe 3D reconstruction. Among the different onboard sensing systems, the omnidirectional camera (e.g., catadioptric cameras, fisheye cameras) is the most popular design choice due to the full pipe surface coverage at a single shot. The collected images are then passed into the SfM workflow to obtain the 3D pipe model. For example, a previously proposed solution proposes dividing the image-based in-pipe reconstruction into two steps: First, the method split the collected fisheye images into triplets and computed the local pipe structures by tracking the feature points at each triplet. Second, the locally reconstructed models were merged into a longer sequence with hierarchy BA. Instead of directly processing on the raw image data, a prior solution unrolls every input image using a spherical projection which facilitates the feature tracking and the image triangulation process. The method employed the known camera poses and the pipe geometry to correct the model distortion.

To correct the scale ambiguity from the monocular image data, a prior solution proposes merging the calibration data with the known pipe geometry (i.e., diameter). Sliding window sparse bundle adjustment (SBA) is employed to compute the inline robot poses as wells as the pipe surface map. The method also detected the pipelines as straight and T-shape and enables the reconstruction of a network of pipelines. A similar pipe reconstruction strategy was presented in another previously proposed design, where the geometry of a small pipe network was reconstructed using an endoscopic camera. The method integrated the conic shape detection into the objective function of BA optimization, which makes it robust to the scale drifting errors. However, similar to these approaches, the method requires the dimension (e.g., diameter) and/or the shape (e.g., straight, elbow, cylinder, etc.) of the pipe to be surveyed as the input (for model fitting operation), which may fail to recover the in-situ geometry of the pipelines.

Compared to the usage of the omnidirectional cameras, the studies on pipeline reconstruction using depth cameras are limited because of the limited camera FOV and the depth inhomogeneity. For example, a previous solution proposed a verged stereo system for the 3D pipe surface mapping. The system pre-tuned the baseline/parallax angle of the stereo system for the selected pipe such that the depth map of the pipe surfaces can be recovered through multi-view geometry. However, due to the limited FOV of the stereo system, multiple passes are required to cover the entire pipe wall. More recently, another study investigated the performance of 3D pipe mapping using a single front-viewed RGBD camera (i.e., RealSense D435). While the 3D accuracy can be improved with the proper camera configuration (i.e., enable active infrared (IR) projector or under sufficient illumination condition), the study only achieved the centimeter-level accuracy which is insufficient to accurately recover the pipe geometry. Another study proposed a trinocular stereo system to reconstruct the 3D geometry of straight pipes. Each 3D point was estimated by correlating the homogeneous points between the cameras. While the system reached the high geometrical accuracy, the presented method requires heterogeneous textures for the accurate 3D points estimation which might not be applicable for operating pipelines where the in-pipe textures are often sparse and repeated.

A real-time in-pipe inspection robot was developed that combines RGBD mapping with laser profiling for 3D reconstructions at millimeter level accuracy. The system generates the point cloud model by triangulating the readings of a stereo IR system at the projected laser ring. The color readings of an RGB camera are then embedded into the point cloud through extrinsic calibration. Because the depth values are only computed at the laser rings, the robot has to move extremely slowly (0.2 m per minute) in order to obtain a dense map, which limits its efficiency for inspecting the long pipelines. In addition, wheel encoder was used to localize the robot within the pipe and that may result in the drifting problem when the pipe surface is not even.

In contrast to the existing studies, the ILI system and method proposed herein use multiple depth cameras that generates a dense, complete, and high-fidelity 3D pipe reconstruction with a single pass. In addition, the system and method tracks the in-pipe motions based solely on the image data and enables the robot to travel across pipelines at moderate speed (i.e., 0.5~1 m/s).

With respect to reconstruction using multiple cameras, in recent years, dense 3D reconstruction via multiple low-cost, commodity depth cameras has gained increased popularity in the visual computing and computer vision community. Conventional multi-camera calibration involves the techniques of estimating the camera extrinsic parameters. This can be achieved by capturing a planar checkerboard placed at several positions. The camera extrinsic transformations can then be estimated by minimize the reprojection errors of the checkboard's crossing points detected in the RGB images. However, such optical approach often results in the poor registration result due to the missed consideration of the depth data. An alternative approach is to use the robust simultaneous localization and mapping (SLAM) and SfM techniques that aligns both the color and depth images either between the cameras or through a specifically designed 3D reference target. While these approaches can generate improved results, the methods are laborious to apply, have the certain requirements of the camera movements (e.g., for loop closure), and might be only applicable to certain camera layouts and/or in the controlled environment where there are sufficient textural and the geometrical features to be extracted (e.g., 1D line, 2D planes, 3D corners).

In practice, the irregular geometric distortion of the depth cameras negatively affects 3D reconstruction quality. One way to address this issue is to allow the depth data to deform non-rigidly while reconstructing the scene. Recent works jointly calibrated and registered the intrinsic depth distortions and the extrinsic poses of the cameras into an artificial-free reconstruction through a field of space varying transformations. Specifically, one proposed solution separated the 3D space captured by the depth cameras into a set of 3D voxels. The rigid transformations that align the overlapped 3D data within each voxel are individually estimated. While this method yielded visually appealing results, it only morphs the scene geometry rather than correct the actual depth distortion. To overcome this limitation, another solution developed a sweeping-based volumetric calibration method that corrects the depth distortion in tandem with the extrinsic calibration. The method took the video while moving a checkerboard across the calibration space. A motion-capturing system was used as the ground truth data within each voxel of the space. However, this technique required inspectors to carefully move the checkboard and required an external tracking system. To address these limitations, the authors proposed a new calibration approach for the onboard DCA that eliminates the need of the moving cameras/checkboard and the tracking system. The new approach only requires a single shot image from each camera, which significantly reduces the manual efforts needed to calibrate the ILI system. We achieve this by constructing a pipe-shaped 3D maker map, formatting the in-pipe calibration space based on pipe geometry, and integrating the cylinder fitting operations with the 3D data registration. Moreover, the proposed calibration method only needs to perform on a standard pipeline once and can be applied to a pipeline with varied surface texture or geometrical dimensions within a pre-defined tolerance.

A system 100 in accordance with the disclosure is shown schematically in FIG. 1A in an operating position within a pipeline 102, shown transparent and sectioned for illustration of the exemplary embodiment for the inspection system 100 operating within the pipeline 102. The system 100 includes a robot 101 having a frame 104 onto which wheels 106 that are in an inclined position contact the interior of the pipeline 102 to propel the robot forward (towards the left, in the illustration of FIG. 1A). The wheels 106 are arranged to move along a respective inclined axis relative to the frame 104 such that pipes of different diameters can be accommodated. For illustration, the wheels can be retracted closed to the frame for smaller pipes, and be extended for larger pipes such that the robot 101 can be disposed relative centrally within the pipe during operation. The frame 104 includes at least four cameras 108 mounted on the front, a controller 110, and an actuator module 112. The term "controller" is used to denote any one or any number or functional modules that may be included on the robot 101. In the illustrated embodiment, for example, the controller 110 includes a computing module 110A, which is an onboard computer, a battery 110B, for powering the wheels and also the cameras and the onboard computer, and a sensing module 110C, which includes lights, cameras and other sensors, as appropriate. The computing module 110A includes a processor (e.g., a Micro PC with Intel Core i7 CPU), memory (e.g., random access memory (RAM), read only memory (ROM), write once read many memory (WORM) and the like) and storage (for example, a hard disk drive (HDD), a solid state drive (SSD), e.g., Samsung 980 PRO SSD, compact disc (CD), and the like) connected, for example via PCIe, for onboard image processing and data retrieving, but other components and configurations can be used. In the illustrated embodiment, the rover uses four wheel-drive powered by the actuator module or battery 110B, which in this embodiment is a 36-volt battery pack. The robot may further include additional components such as the actuator module 112, which includes electrical components for processing and delivering power to drive the wheels, actuators for moving the cameras relative to the frame, and the like. The robot 101 is configured to move inside the pipe without tether and supports the long-distance inspection purposes.

The system disclosed herein refers to a robot as a vehicle for transporting the system through the pipeline. Other types of vehicles may also be used. In particular, a pig may be used to transport the system.

Figure 2A:
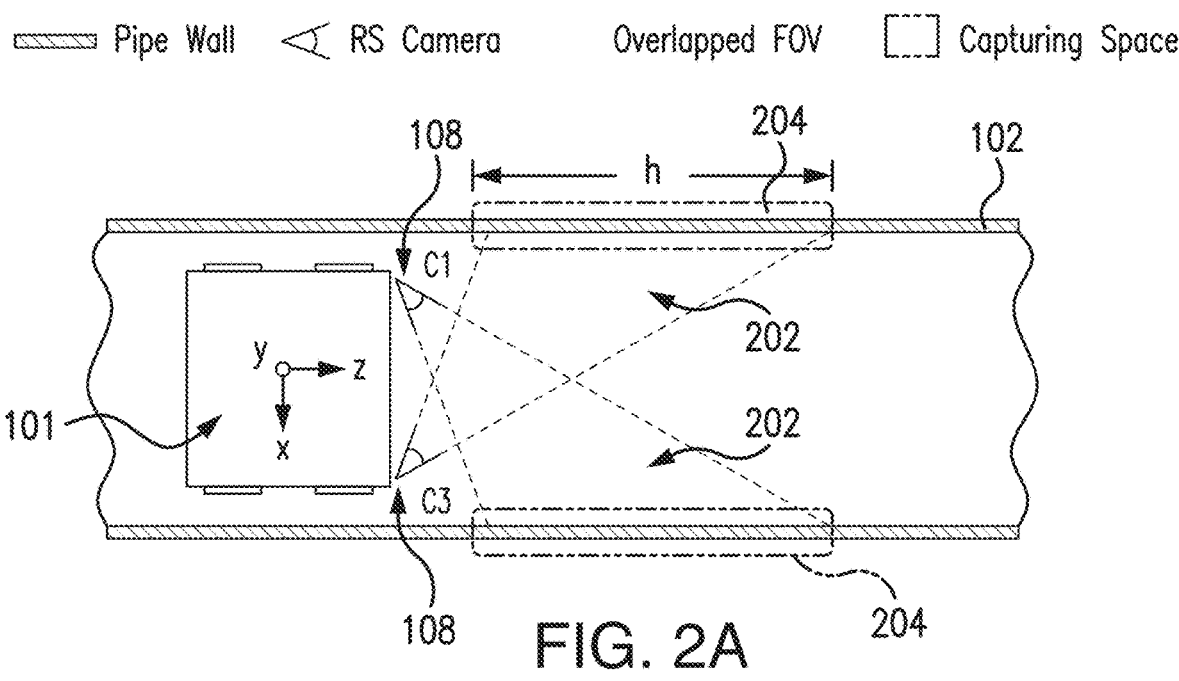
FIG. 2(a) is a schematic view of the system of FIG. 1A in an operating condition viewed from a plan perspective.
Figure 2B:
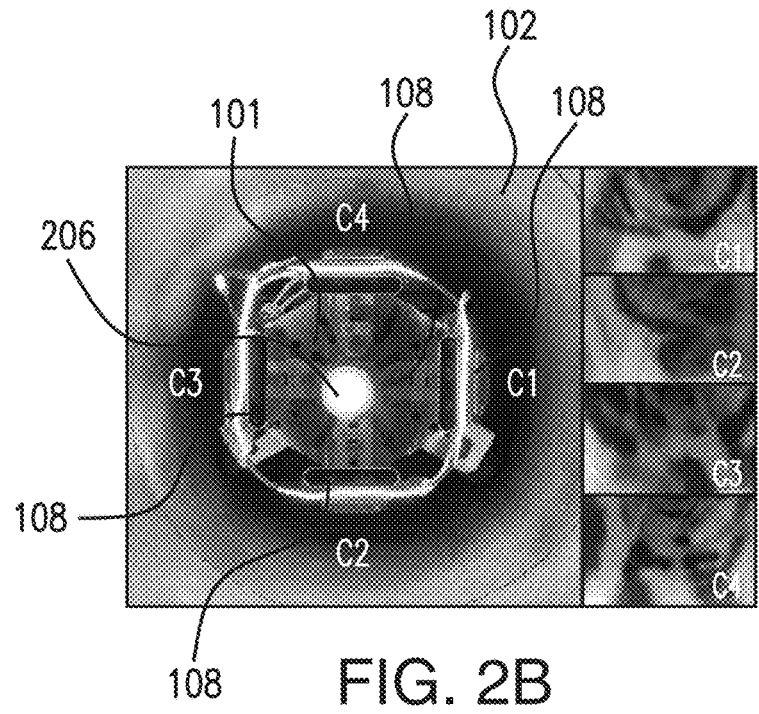
FIG. 2(b) is an illustration of the system of FIG. 1A in an operating condition, viewed from a front perspective.

Motion of the robot 101, which can also be referred to as a rover, can be autonomous or it can be remotely controlled by an operator. The controller can also be programmed to control the rover to travel in the pipeline at a fixed traveling speed along the pipeline. The DCA sensing module of the controller 110 is the core of the proposed system, and in the illustrated embodiment includes four Intel RealSense D435 cameras (abbreviated as RS camera). The RS cameras were selected due to their small size, light weight, and high resolution when compared to other available products. The RS camera relies on the stereo triangulation of two IR sensors to estimate the depth values at each pixel. This strategy would not cause the IR interference noise when multiple cameras are utilized, as opposed to the time-of-flight (ToF) cameras (e.g., Microsoft Kinect). However, stereo cameras have the minimal resolvable depth (Min-Z), which is hardware constrained by the baseline of the two sensors. This Min-Z constraint makes it infeasible to place the cameras perpendicular to pipe walls when the pipeline's diameters are close to or less than Min-Z. To overcome this limitation, instead of facing the cameras outward, we tilt each camera inwards to cover the opposite pipe walls. In alternative applications, for example, when inspecting a larger pipe, the cameras can be inclined outwardly. The cameras are also mounted on sliding brackets so that their relative distance from one another can be adjusted to achieve a desired viewing pattern when inspecting smaller or larger pipes. It should also be noted that the cameras are used to view overlapping views of the pipe, as will be described hereinafter. Accordingly, even though 4 cameras are used in the illustrated embodiment, fewer than four, such as three or two, or more than four, such as five, six and the like, cameras may be used. A schematic view of the system 100 deployed within the pipeline 102 is shown in FIG. 2(a), and a picture of the system 100 operating within the pipeline is shown in FIG. 2(b).

Figure 1B:
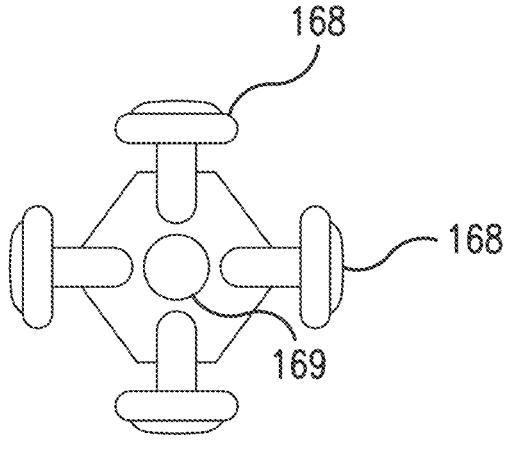
FIG. 1B depicts a depth camera array in accordance with the disclosure.

FIG. 1B depicts a depth camera array. The embodiment shown in FIG. 1B includes four depth cameras 168. An additional camera (in this embodiment, a fifth camera) 169 is shown at the center of the depth camera array.

Figure 1C:
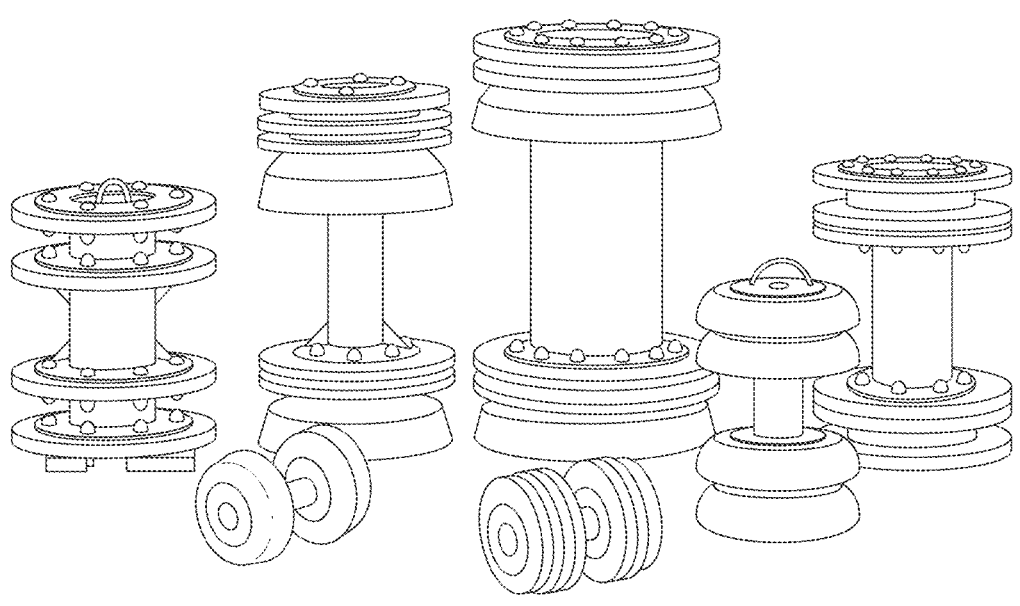
FIG. 1C depicts various views of different types of pigs in accordance with the disclosure.

FIG. 1C presents a variety of pigs of different sizes and types. Pigs may be used as a vehicle in the system described herein. Pigs, by nature of their design, tend to have their axis of symmetry substantially parallel to, if not in fact collinear with the axis of the pipeline in which they are inserted.

Figure 1D:
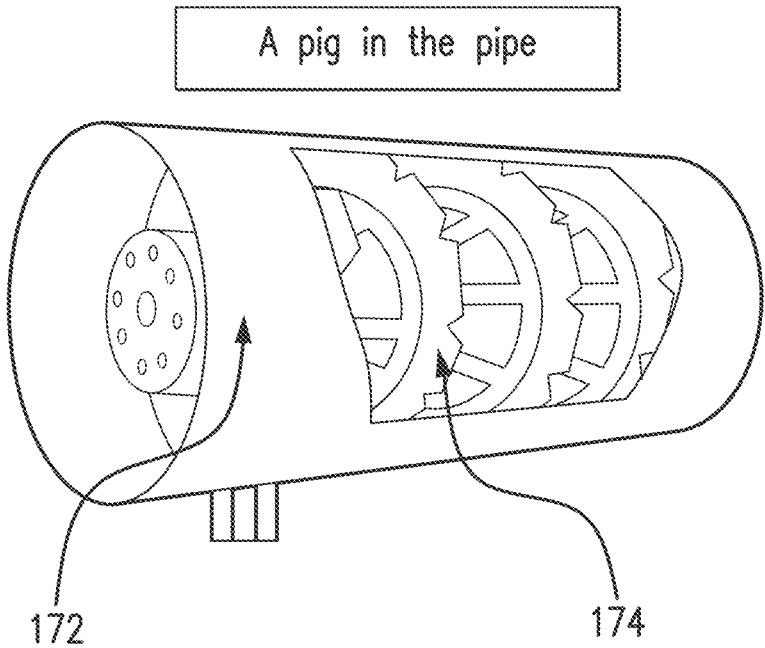
FIG. 1D depicts a pig in a pipe in accordance with the disclosure.

FIG. 1D presents a cutaway view of a pipeline 172 showing a pig 174 in the pipeline.

With respect to FIGS. 2(a) and 2(b), the robot 101 includes four cameras 108 (only two visible in the section view shown), each of which points inward to cover a viewing angle 202, which covers a capturing space or view 204 of the wall of the pipeline 102. For larger pipes, the cameras may be pointing outward. As the robot 101 moves along the pipeline 102, the view 204 sweeps along the wall. In one exemplary embodiment, for a standard 14" (355.6 millimeter inside diameter) pipeline, it was found that setting the tilted angle around 35 degrees fulfills both the constraints of the Min-Z and the density of the depth readings. This setup also helps to reduce the number of RS cameras needed to cover the entire pipe wall inside surface. A reduced number of cameras is beneficial for real-time image processing and data storage. A forward-looking LED light 206 and circular LED lights (not numbered) are attached around the cameras, to provide necessary illuminations inside the pipeline, as shown in FIG. 2(b). The LED lights are used to provide a generally diffuse but uniformly illuminated ring around the periphery of the pipe and in front of the robot that is viewed and images of which are acquired by the cameras as the robot moves along the pipe. It is noted that any lighting configuration can be used for this purpose. Additionally, the central LED light 206 can be used in conjunction with an additional, here, fifth camera, which views forward as the robot travels. This fifth camera (not shown here) improves 3D reconstruction of curved portions of pipelines.

With respect to calibration of the images acquired from the cameras 108, the intrinsic parameters of the RGB sensor and the rigid transformation that maps from the depth-to-color frame of each RS camera are typically provided by the manufacturer of a camera and can be used in the calibration. The disclosed method combines the calibration of the extrinsic transformations between the RGB sensors, and the depth distortion of each IR sensor. An overview of the proposed cameras calibration method is shown in the diagram provided as FIG. 3.

Figures 1, 3:
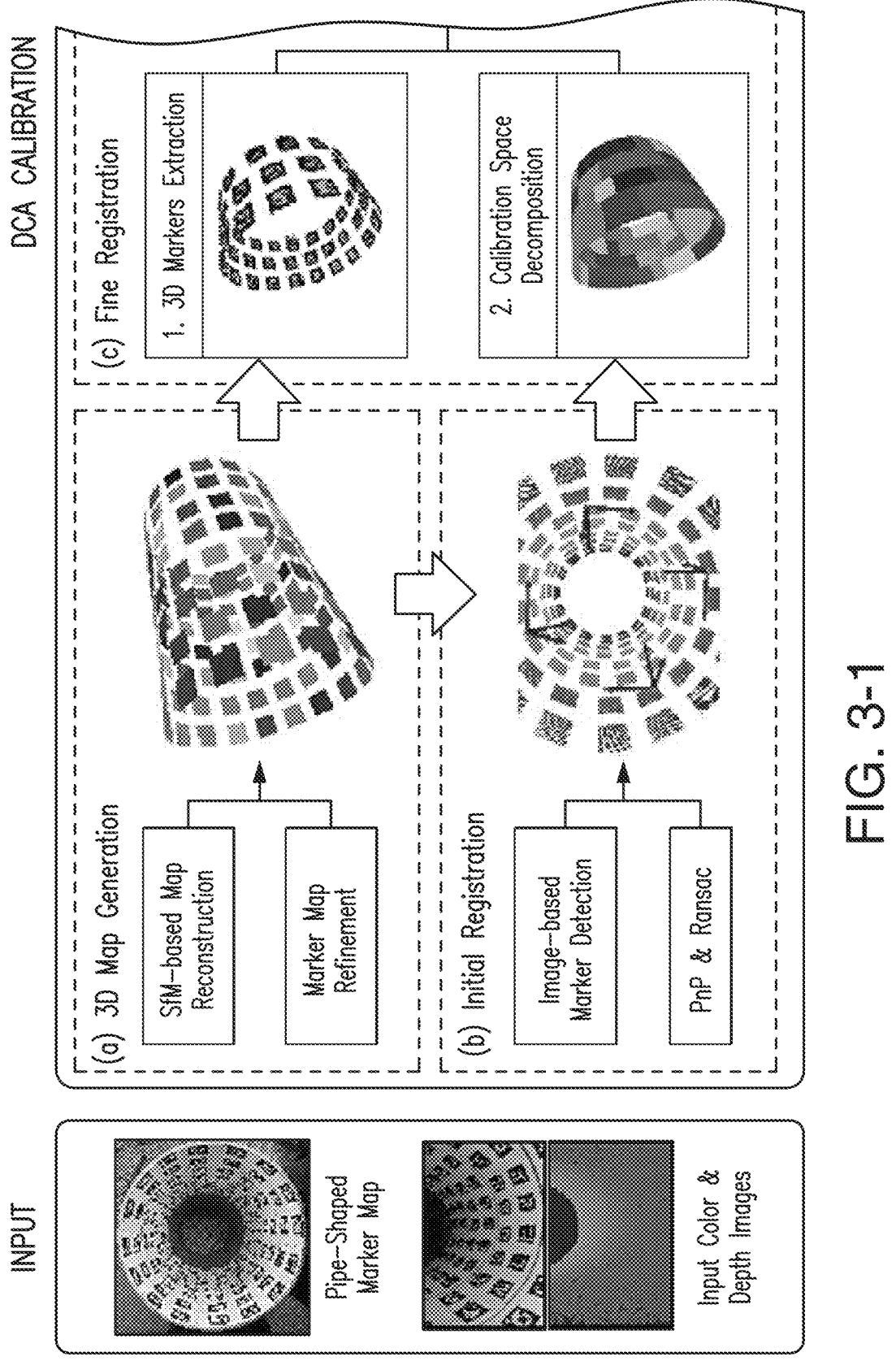
FIG. 3 is a flowchart for a method in accordance with the disclosure.

In reference to FIG. 3, the method includes defining the calibration space given the cameras setup and the pipe geometry. Based on this information, a pipe-shaped 3D marker map is constructed as the reference for the visual and the depth correction across the calibration space. The proposed calibration is performed in a coarse-to-fine fashion: the extrinsic transformations of each RS camera are initially estimated by formulating the problem as a Perspective-n-Point problem. This is achieved by matching the markers detected in each color image with its 3D correspondent locations in the map. Using the estimated camera poses as the initial transformations, depth distortions are corrected by volumetric registering the camera projected marker point clouds to the marker map. The reference map is decomposed based on the marker locations and the rigid body transformation within each decomposed space is found by locally aligning the camera extracted markers to the map. Finally, the marker map computed transformations are smoothed throughout the calibration space. The output of the proposed calibration method is a 3D lookup table consisting of a smooth field of rigid body transformation that fuses the RS cameras into an accurate and unified pipe model.

Figure 4:
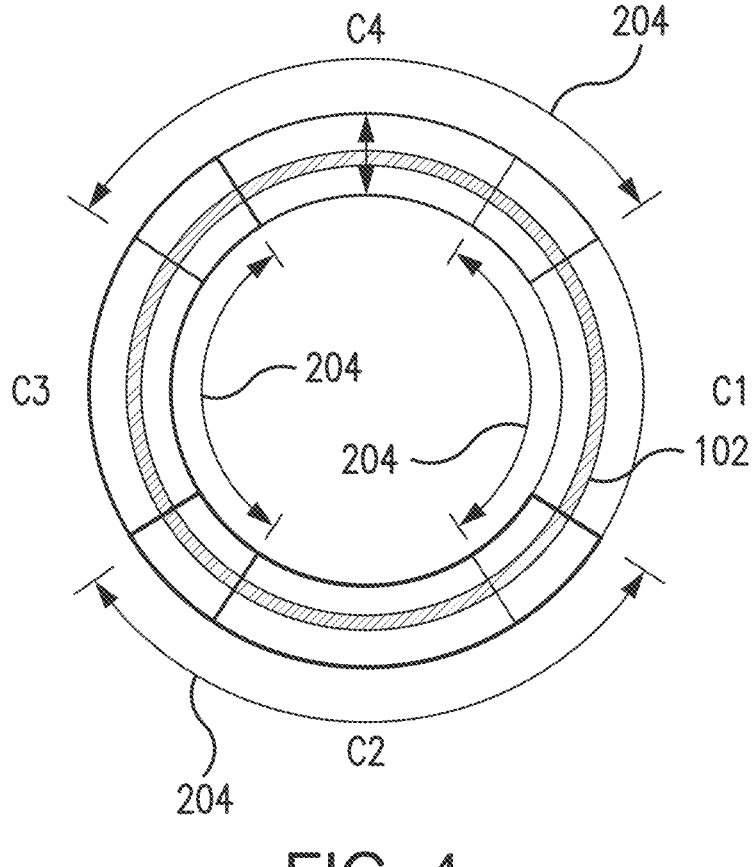
FIG. 4 is a schematic arrangement of camera views in accordance with the disclosure.

FIG. 4 is a schematic that demonstrates the calibration spaces of the onboard RS cameras, which are marked in this figure as C1, C2, C3, and C4. As can be seen in this view, the views of the cameras as seen from the axis of the pipeline overlap. A similar overlapping arrangement would be used in the event fewer or more than 4 cameras were used. Because the subject is the internal pipe wall surface, only the spaces around the pipe wall need to be calibrated. For a straight pipe segment, the calibration space is formed as a circular tube with the length d defined based on the projection of the camera FOV along the pipe axis and the thickness t as the tolerance given the pipe diameters. Noted existing multi-cameras calibration methods often relied on the overlapped spaces to conduct the calibration. In the proposed ILI system, there are no common spaces shared by all four cameras. This condition, combined with the tubular shape of the calibration space, makes it difficult to be handled by the existing strategies.

Several coordinate systems are used in the calibration. We define $C_i$ (i=1 . . . 4) as the coordinate system of the ith camera where (u, v) is the coordinate on the image plane and d is the z-depth along the camera's principal axis. We set the 3D pipe coordinate system in the Euclidean space as P where the z-axis always lies along the pipe's centerline. The coordinate system of the in-pipe robot is defined as R with (x, y, z) denoting the pitch, roll, yaw of the robot motion. The origin is set at the geometric center of the rover with the z axis pointing along the pipe's axis. Because the rover might not always be located at the pipe' centerline, a translation is needed to transform from the robot to the pipe coordinate system. And finally, we define W as the world coordinate system that can be transformed from the robot coordinates if the GPS at the starting location of the in-pipe robot is known. A front view of the calibration space formed by the four RS cameras is shown in FIG. 4. Dashed lines denote the pipe wall 102. Each color or segment 204 highlights a 3D calibration space of the correspondent RS camera.

Figure 5A:
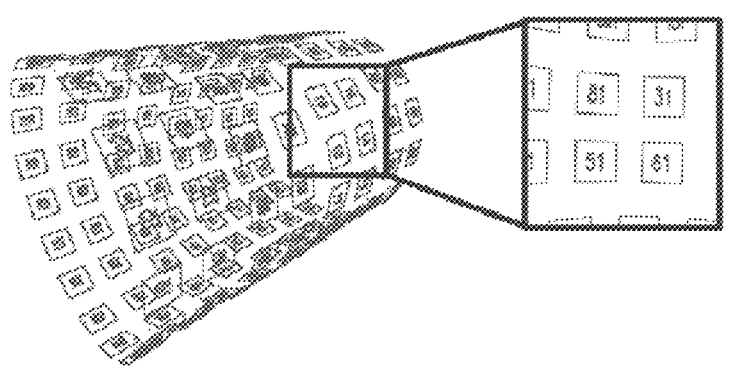
FIG. 5(a) is a schematic arrangement of targets in accordance with the disclosure.

In the present disclosure, a pipe-shaped marker map $\mathcal{M}$ is constructed as the 3D reference for calibrating the RS cameras. The map is composed of a set of unique ArUco markers attached at the inner surface of a circular pipe, as shown in FIG. 2(a). The markers are designed at the unified size (i.e., 4×4 cm) and attached at the pipe at varied spacing (i.e., from 2.5 cm to 4.0 cm). This setup avoids the geometrical ambiguity for the correction of depth distortion. The initial 3D representation of the map is generated by collecting a set of overlapped color images and processed using the marker-based structure-from-motion. Because each marker is unique, the poses of the markers are estimated by combining the markers detection with the SBA optimization. The sub-millimeter accuracy reported on the small scene show the practicability of using the reconstruction as the 3D representation of the physical map. FIG. 5(a) shows the rendered marker map with the associated marker ids. It is noted that the initially reconstructed markers are assumed to be planar. However, in reality, the markers attached at the circular pipe wall are bent as they follow the internal, curved contour of the inside wall of the pipeline. These deformations must be recovered for the accurate 3D representation.

Figure 5B:
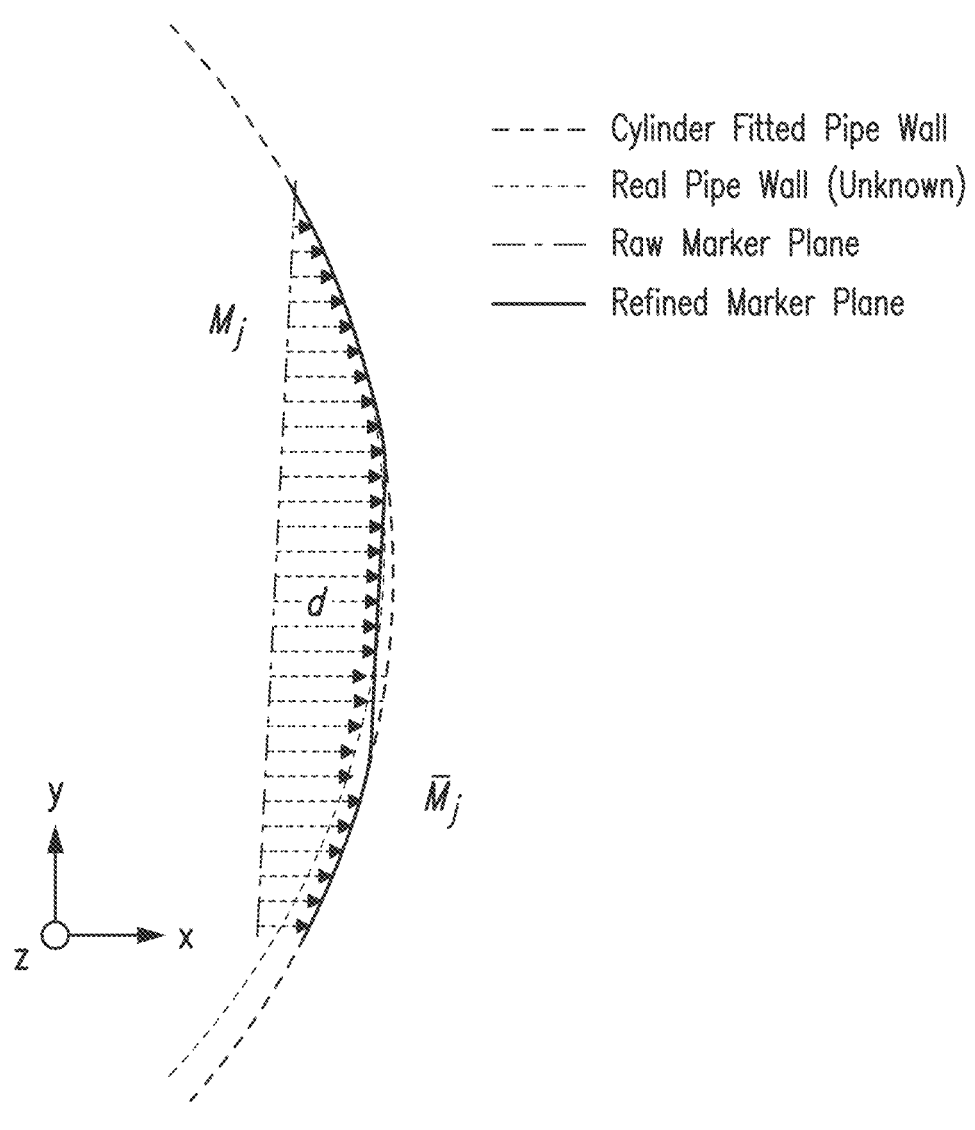
FIG. 5(b) is a graphical representation of a curve fit for a target in accordance with the disclosure.

Because the initially rendered markers are deformed along the pipe axis with the profile of each marker following the curvature of the pipe segment, these markers can be further refined based on the pipe geometry. In this study, the problem is handled by (1) fitting the pipe into a cylinder model; and (2) correcting the markers by projecting the points from the marker planes to the cylinder surface. In the first step, we reconstruct the circular pipe as a perfect cylinder using the normal to the marker planes (i.e., computed based on the cross product of two vectors on each marker). The cylinder axis is estimated with Principal Component Analysis (PCA) where the eigenvector associated with the least eigenvalue is selected. We then project the corners of the detected markers along the estimated cylinder axis, and fit the projected 2D circle with the least squares (LS) optimization. The fitted center and radius of the circle, along with the cylinder axis, generates the parametric pipe surface model. In the second step, we bend each initially rendered marker $\mathcal{M}_j$ (j=1 . . . m) by projecting each point on the marker plane along its normal direction. The points with the minimal distance to the surface of the model are selected as the point on the refined marker $\overline{\mathcal{M}}_j$ (as in Eq. 1).

$$\overline{\mathcal{M}_j^p} = \operatorname*{argmin}_{\sigma} d(\mathcal{M}_j^p + \sigma \mathcal{M}_j^n, P) \tag{1}$$

Where $\mathcal{M}_j^p$ and $\mathcal{M}_j^n$ respectively denote the points and the normal vector to the rendered marker $\mathcal{M}_j$, and $\overline{\mathcal{M}_j^p}$ is the projected marker point. P denotes the fitted pipe surface, d is the Euclidean distance, and $\sigma$ is the coefficient that indicates the step of the projection. To avoid the imperfect condition of the pipe segment (i.e., pipe with minor deformations or local surface unevenness), we restrict $\sigma$ within ±2 cm. FIG. 5(b) illustrates the concept of the map refinement at a single marker. The refined marker is a closer estimation to the real pipe geometry as opposed to the initial estimation. This map will then be utilized as the 3D reference target for the depth correction. In these representations, FIG. 5(a) represents the initially rendered marker map and the highlighted marker ids in the map; FIG. 5(b) illustrates the refinement of the initially rendered marker $\mathcal{M}_j$ (in blue) to the curved representation $\overline{\mathcal{M}}_j$ (in red) in the map.

The initial registration estimates the extrinsic transformations of the RS cameras without considering the depth distortion. By putting the rover inside the pipe with each camera covering a portion of the map, a single snapshot of both the color and depth frame are taken from each camera (as in FIG. 3). Because the 6d pose of every marker in the map has been calculated, and the marker positions within the 2D color image are extractable, thus the relative pose of the cameras can be obtained through the 2D-to-3D correspondence. Specifically, the marker corners are extracted from the color images and the correspondent 3D points in the refined map are found by matching the markers with the same ids. The Perspective-n-Point (PnP) is utilized to recover the 6d pose of each camera. Because more than one marker is covered by each camera, redundant corner points are extractable. Thus, RANSAC is employed to handle the redundancy while increasing the robustness of the pose estimation. FIG. 3(b) shows the 6d poses of estimated RS cameras using the PnP method.

The objective of the fine registration is to correct the non-linear, systematic depth distortion based on the refined marker map. The basic notion is to find a field of rigid body transformations across the tubular calibration space where the overall registration errors from the cameras' depth readings to the marker map is minimized. To achieve that, the markers from the RGBD image, for each camera, are extracted. Based on the initial transformations, the 3D markers can be projected into the pipe coordinate system. Next, the marker map is decomposed into submaps based on the distribution of the markers in the map. Within each decomposed submap, point set registration is employed to find the single best rigid body transformation that aligns the markers extracted from the images to the correspondence in the map. Finally, the calibration from a collection of 2D submaps is generalized to the 3D calibration space. The method outputs a 3D lookup table consisting of a smooth field of rigid transformations, which automatically converts the RGBD images taken from the cameras into a unified 3D pipe point cloud. FIG. 3 at (c) shows the workflow of the fine registration. The major steps are discussed in detail in the following paragraphs.

For each camera, the marker is extracted from the color image, and converted into the point cloud model for the post processing. Specifically, the four corners of every marker detected are extracted in the color image. The four corners are connected as a polygon and the pixels are filled within the polygon using the flood-fill algorithm. Because the depth frame is synchronized with the color image, the depth readings at the same pixels are cropped. Combining the extracted color and depth pixels, the 3D markers are extracted from each camera. FIG. 3 at (c–1) shows the 3D markers point cloud that is initially extracted from the four cameras, and then projected into the pipe coordinate using the initial transformations.

The marker map is decomposed into the local 2D submaps such that the transformation estimated within each submap is rigid. Because the markers are already spatially distributed in the map, we can use the locations of the markers to decompose the map. It is noted that ArUco markers have the symmetrical geometry (i.e., square), thus direct marker-to-marker alignment may cause the orientation ambiguity. To avoid such issues, we define that each submap must cover a neighborhood of the markers. By setting the center of the current marker as the pivot, the neighbor markers are selected if its distance to the pivot is less than a pre-defined threshold. In this study, we set the distance threshold as 7 cm and require at least two neighbor markers to be included in each submap. FIG. 3 at (c–2) shows the decomposed submap using the proposed method and illustrates the same using color-coding.

In the present disclosure, we select the probability-based point set registration to compute the local transformation within each submap because the 3D markers cropped in each submap might still contain the non-systematic random noises. Compared to the commonly used Iterative Closest Point (ICP), which is sensitive to such noises, the probabilistic-based registration, such as the coherent point drift (CPD) interprets the point cloud as a probability density distribution (especially the Gaussian mixture model) which is more robust to the outliers.

Figures 2, 3:
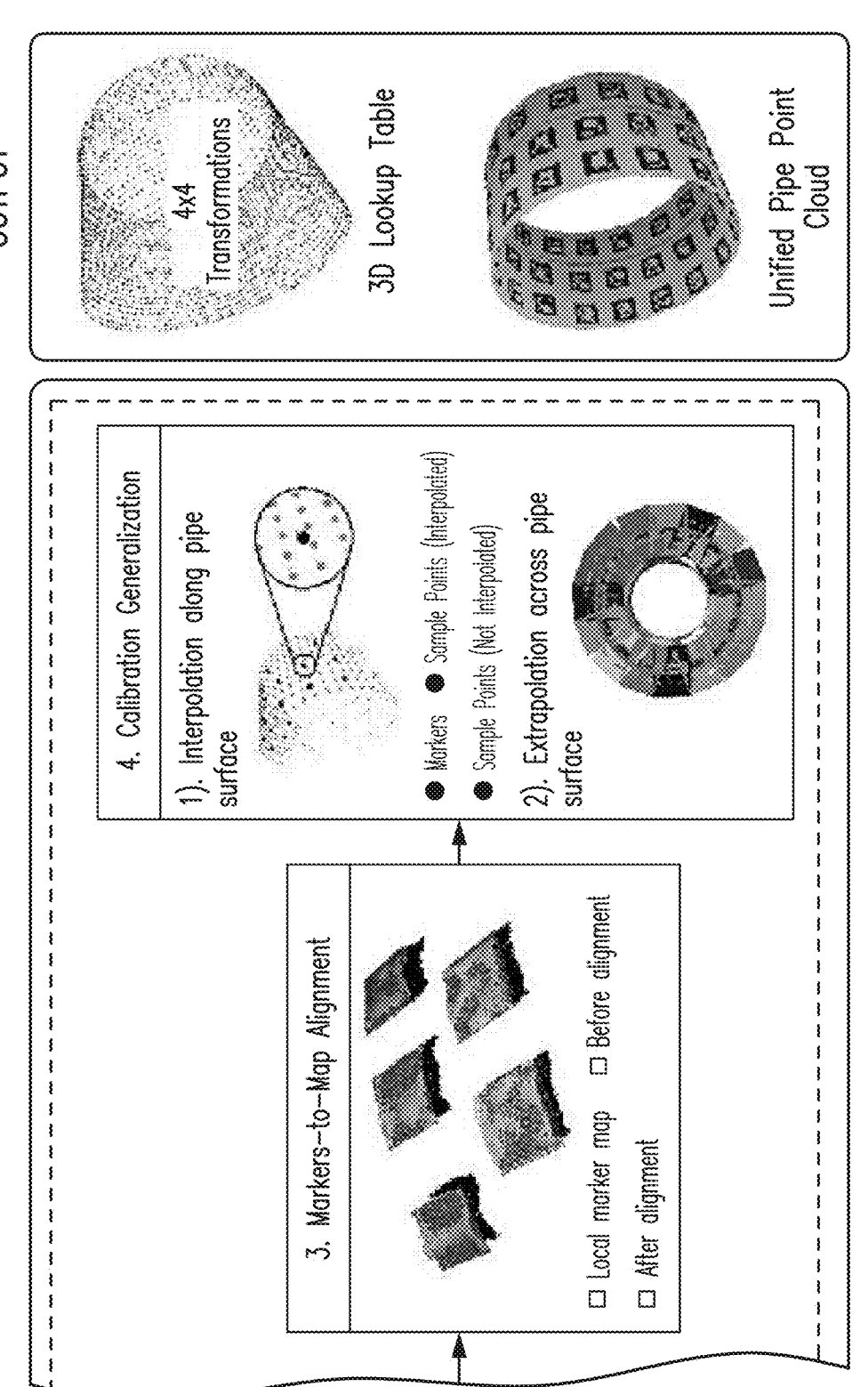

The transformation of the point cloud can then be found using the Expectation Maximization (EM) algorithm. In the present disclosure, a variant of the CPD is employed, the FilterReg that augments the E step by solving the correspondence search through the Gaussian filtering method. The method has the improved efficiency and the comparable accuracy for a small dataset that is the ideal solution for our case. With the parallel processing, the transformations within all the submaps can be computed in seconds. FIG. 2 at (c–3) shows an example of the markers-to-map alignment within a submap. Advantageously, the probability-based method is robust even with the existence of the random noise on the extracted 3D markers.

In the previous steps, a field of rigid transformations across the marker map is obtained. However, these transformations cannot be directly applied to other pipelines because (1) the computed transformations might cause the artifacts due to the non-uniform results across the pipe: the spaces close to the centers of the markers are well calibrated while the space at the boundaries between the submaps may be ill-calibrated; (2) the transformations computed from the marker map (attached on the internal pipe surface) only work if the pipeline to be inspected is exactly identified to the calibration pipe. In practice, there are patches, bulges, and even deflections existing on the operating pipelines, and the calibration result should be tolerant to such variations. Thus, a method is described herein to smooth and generalize the transformations across the calibration space. The method is performed in two sequential steps: First, we re-sampled the submaps along the pipe surfaces into a dense set of 2D cells. Scatter data interpolation is employed to fill the empty cells and achieve the higher accuracy; Second, each cell is extrapolated into a 3D voxel across the pipe surface, filling the transformations in the 3D space.

Interpolation along pipe surfaces includes unrolling the 3D pipe model onto a 2D plane such that the data interpolation can be performed in a linear fashion. Thus, a cylinder model is first fit to the pipe geometry. Then, a dense set of point at fixed intervals on the cylinder surface is uniformly sampled. The cylinder is unrolled so that the newly sampled points as well as the pivots of the computed transformations are projected on the 2D plane. Next, an octree is constructed to perform the quick search of the neighbor pivots for each point. If more than one pivot is found, Inverse Distance Weighting (IDW) is utilized to interpolate the transformations at the point. It is noted that the IDW on the 4×4 transformations cannot be directly performed because of nonlinearity of the rotation matrix. Thus, each rotation matrix is converted into the quaternion and the IDW is performed to the quaternions at the exponential space. The interpolated quaternions are then converted back to the rotation matrix and integrated with the interpolated translations. After that, a 2D cell centered at the sampled points and formed the 2D space of the interpolated transformation is constructed. The above process is parallelized to compute the interpolated transformation at each cell. At a final step, the sampled 2D cells and the associated transformation in each cell are reprojected back to the 3D pipe space. FIG. 3 at (c-4-1) presents an example of the interpolated rotation matrix of a RS camera.

For extrapolation across pipe surfaces, for each 2D cell (with the interpolated transformation) on the pipe, the surface normal to the pipe surface is computed and the 2D surface is extruded into a 3D voxel. The height of the voxels is determined by the calibration space, indicating the tolerance (T) on pipelines with different geometries. FIG. 3, at (c-4-2), shows the 3D voxels colored across the pipe surface.

A flowchart of a method for the automated pipeline surface reconstruction by incorporating the calibration into a robust camera motion estimation approach is shown in FIG. 6. The method include a first step, which involves the synchronization of the video sequences from different cameras because each RS camera use its own hardware clock for time stamping. Exact frame-to-frame synchronization is desired. However, hardware synchronization significantly increases the computational load and memory usage during the data acquisition. Therefore, due to the high frame rate (i.e., 60 HZ) of the video collection and the relative slow driving speed of the in-pipe rover (i.e., ~1 m/s), a temporal filter is employed that continuously examines the incoming timestamps within the image headers. By using the timestamp from one camera as the reference, the synchronized images can be collected by finding the nearest header at a subsampled timestamp. A potential advantage of using this soft synchronization strategy is that the images that need to be saved on the onboard computer for the inspection of longer pipelines (e.g., several mils) can be reduced. For the synchronized image sequences, the color and depth frames at each timestamp is registered using the 3D lookup table. The output is a sequence of timestamped pipe point clouds collected as the rover travel along pipelines.

For each pipe point cloud, a virtual front-viewed and center positioned RGBD camera (i.e., color and depth frame) is generated. The virtual central camera location is defined at the intersection between the pipe axial line and the plane formed by the four RS cameras. The resolution of the central camera is set as [500, 500] with the intrinsic matrix determined by the pinhole model. Specifically, the camera focal length is defined as a unit pixel, the principal point offset at the center of the image plane, and lens distortion as zero. To compute the color and depth values at each pixel, the unified point cloud is first transformed to the image plane using the projection matrix. Next, the color/depth value is calculated at each pixel as the median of the neighbor points within a pre-defined distance. To minimize the color reading noises caused by varied illumination conditions of each camera, moving least square (MLS) is used to interpolate and, at the same time, smooth the color readings at each pixel. Instead of constructing the polynomial fit function globally, MLS computes a locally weighted least square fit at each point. The neighbor distance threshold is set as 0.5 mm and the error function is defined in the quadratic form. It is noted that the MLS is performed at the color space such that the detailed geometric features from the depth readings are preserved. Based on the proposed method, the input point clouds can be converted into a sequence of front viewed RGBD images. FIG. 7(a) shows the virtual camera rendered color, and the depth image of the calibration pipe is shown in FIG. 7(b).

In this section, the motion of the rover over timestamps is calculated based on the rendered RGBD image sequence. Compared to the unstructured point cloud, the major advantage of using the RGBD sequence is that the gradient of the local color and depth variations are parameterizable in the 2D image planes. Because the interior surface of many pipelines presents sparse textures, frame-to-frame alignment using either the 2D features (e.g., SIFT, SURF) or the pure 3D geometrical registration (i.e., ICP) might fail to achieve the accurate and robust result. Thus, in this study, we employ the colored ICP that estimates the frame-to-frame transformations using the combined information from both the color and the geometry. This is achieved by defining the error function as the weighted sum of the geometric and photometric disparity between the corresponding points. Because the error function is non-convex, we applied the multi-scale registration that iteratively registers the down sampled images to avoid the resulting transformation being trapped at the local optima. We empirically identified that setting the number of iterations at 4 is a good balance between the optimization convergence and the computation efficiency, but fewer or more iterations can also be used.

It is worth noting that the camera trajectory computed from the frame-to-frame visual odometry (VO) can result in the distortion of the reconstruction due to the accumulated drifting over frames. Conventionally, such a problem is handled with the loop closure detection techniques, such as the vocabulary tree. However, in most cases, there are no loops existing for the inline pipe condition because the designed rover is intended to only move along the pipelines in a single pass. Because assuming the depth reading from the central camera is accurate, we can refine the visual odometry using a neighborhood of images. To achieve that, a pose graph is constructed with each node denoting a frame-to-frame estimated camera pose and the edges indicating the rigid transformations between the poses. Initially, the graph is linear because the edges exist only between the adjacent frames. To refine the camera poses, k successive frames at each node are queried. The same registration method as that in the visual odometry is used to compute the transformations. The edge between the nodes is constructed only if (1) there are sufficient overlaps between the selected frames; and (2) the inlier error between the correspondent points is less than a threshold $\chi$. While k is set as 4, $\chi$ is set as 0.1 for all the test cases. We find using the RGB disparity as the only metric is sufficient to measure the inlier errors and refine the transformations. Based on the proposed strategy, the pose graph is constructed. Next, the objective function of the pose graph is formulated into the quadratic formation as in, and optimize the function using $g^2o$. The output of the optimization is a refined camera trajectory which can be used to integrate the unified point clouds at different timestamps into a pipeline surface reconstruction.

Finally, a global surface fusion technique was used, which integrates the rendered RGBD sequence with the computed camera poses into a global system. The volumetric truncated signed distance function (TSDF) was used to incrementally concatenate the RGBD images at each timestamp. The voxel size of the TSDF is set as 2 mm and the initial frame is served as the reference point of the reconstructed model. In the last step, the dense pipe point cloud model is extracted from the measurement, and the model is converted into a surface reconstruction using the Poisson Surface Reconstruction. The reconstructed surface model recovers both the geometry and the surface texture of the inspected pipes that can be utilized as the high-fidelity 3D inputs for further applications.

Various experiments were performed to evaluate the performance of the proposed method. First, the accuracy of the DCA calibration was evaluated using short pipe segments. The pipes were rigid cardboard pipes with the same dimension as the calibration pipe (i.e., the inside diameter of the pipe is 351.6 mm). Internal textures at the pipe surfaces were manually created by either attaching the thin blue adhesive tapes at the interior pipe walls or randomly spraying red/black/white paints inside the pipe. These two pipes are used to evaluate the accuracy of the calibration results when different surface patterns are presented on the two internal surfaces. A third pipe sample was steel pipe with an inner diameter of 338.6 mm, which was slightly smaller than the calibration pipe to evaluate the robustness of the calibration on pipes with different dimension.

Figure 8:
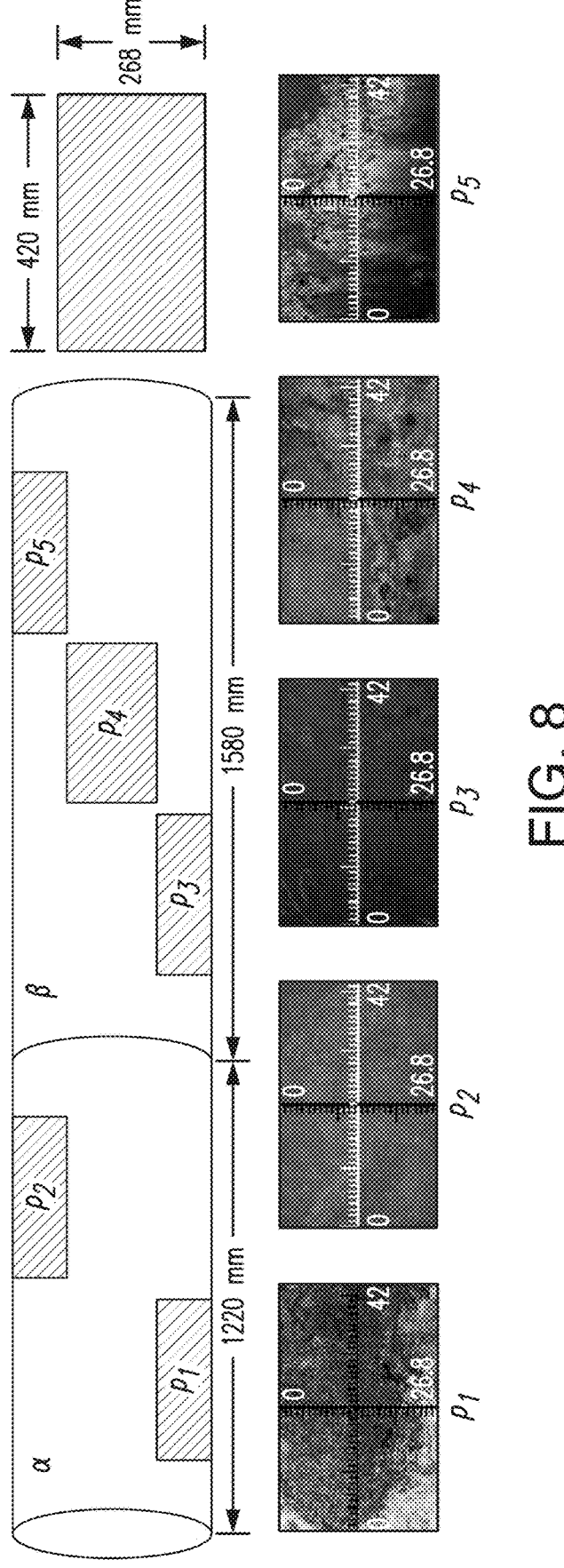
FIG. 8 is a schematic view of an experimental setup in accordance with the disclosure.

To evaluate the performance of the end-to-end 3D reconstruction approach, an experiment using a longer pipeline was used. The 2800 mm long pipeline was composed of two straight cardboard pipe segments ($\alpha$) and ($\beta$). Pipe ($\alpha$) is 1220 mm long with random graffiti patterns. Pipe ($\beta$) is 1580 mm long with randomly sprayed paint patterns. These patterns are created to evaluate the accuracy of the 3D reconstruction when the pipeline internal surfaces have different texture features. To provide more rigorous quantitative evaluation of the reconstruction accuracy, two exact copies of five A3-size papers marked with exact dimension (in length and width) on Cartesian coordinate system were printed with background texture of actual steel corrosion pattern, as shown in FIG. 8, which at the top illustrates schematically the long pipe sample, and below five sheets labelled as $p_1$ through $p_5$. One copy of the five prints is carefully (to avoid any potential stretch stress on the papers) glued onto the internal surface of the pipeline in the locations shown at the top of FIG. 8. Another copy is used as ground truth to be compared with the reconstructed dimensions. By measuring the size of the papers in the reconstructed model, the accuracy of the proposed approach was evaluated. FIG. 8 shows the designed layouts of the five A3 prints and the detailed corrosion image in each print.

The performance of the proposed method was evaluated both qualitatively and quantitatively. For the short pipe segments, the accuracy was evaluated in two aspects: First, the registration errors between the adjacent cameras were evaluated. Two indicators were selected to quantitatively evaluate the registration accuracy, the indicators were: the geometric error ($Error_{geo}$) and the photometric error ($Error_{pho}$). The geometric error measures the geometric distance between the inlier points from each pair of the cameras; the photometric error computes RGB intensity variations between the inlier points. Eq. 2 and Eq. 3 present the equation of the geometric and the photometric errors.

$$Error_{geo} = \frac{1}{|IJ|} \sum_{IJ} \frac{\sum_{ij}^{X}(P(x_i) - P(x_j))^2}{|X|_{ij}} \quad (2)$$

$$Error_{pho} = \frac{1}{|IJ|} \sum_{IJ} \frac{\sum_{ij}^{X}(H(x_i) - H(x_j))^2}{|X|_{ij}} \quad (3)$$

Where IJ is the set of the point cloud pairs, X is the collection of the inlier points. The inlier correspondent points between each pair of the point cloud are calculated using the nearest neighbor technique with the radius of the neighbor size as 10 mm. For each inlier point, P describes the 3D position and H denotes the intensity value (i.e., measured as the sum of the RGB intensities).

Figure 9A:
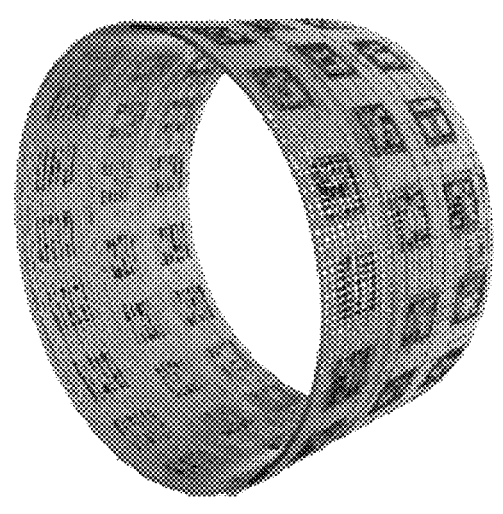
FIGS. 9(a) and 9(b) are reconstructed images in accordance with the disclosure.

Next, the radius of the reconstructed pipes was compared to the ground truth measurement (using laser measurement tool). To achieve that, the pipe model was fit into a cylinder by estimating the principal axis using the PCA; Then the pipe models were divided into K segments along the pipe principal axis. For each segment, we project the points along the principal axis and estimate the radius of the projected circles using RANSAC and the LSO. The mean and standard deviation of the errors between the ground truth and the estimated radius in the segments are obtained. In this experiment, we computed the number of segments K as D/λ where λ equals to 1 mm, denoting the length of each segment. FIG. 9(a) demonstrates the evaluation process on the calibration pipe.

The evaluation of the reconstruction of the longer pipeline is in two aspects. First, we qualitatively evaluate the reconstructed pipeline through the visual comparison between the 2D images generated from the reconstruction and the real-world images, including both the direct observation of the in-pipe surface patterns and the recovery of the unrolled image textures. We achieve this by first fitting the reconstructed pipeline into the cylinder using the aforementioned approach and then unroll the cylinder based on the fitted parameters. The pictures attached at the inner pipe walls can then be recovered. Noted we fitted and unrolled the pipelines α and β separately to avoid the conditions that the combined pipeline is not perfectly straight (i.e., human error).

Next, we perform the quantitative accuracy assessment of the reconstruction by comparing the measured dimensions of the reconstructed pipeline to the physical measurement (i.e., ground truth). We also measure the width w and height h of the recovered pictures in the unrolled model by connecting a straight line between the endpoints of both the horizontal (in blue/yellow) and the vertical (in green/red) axes. We average the results of the five measurements to minimize any human measurement errors.

Figure 9B:
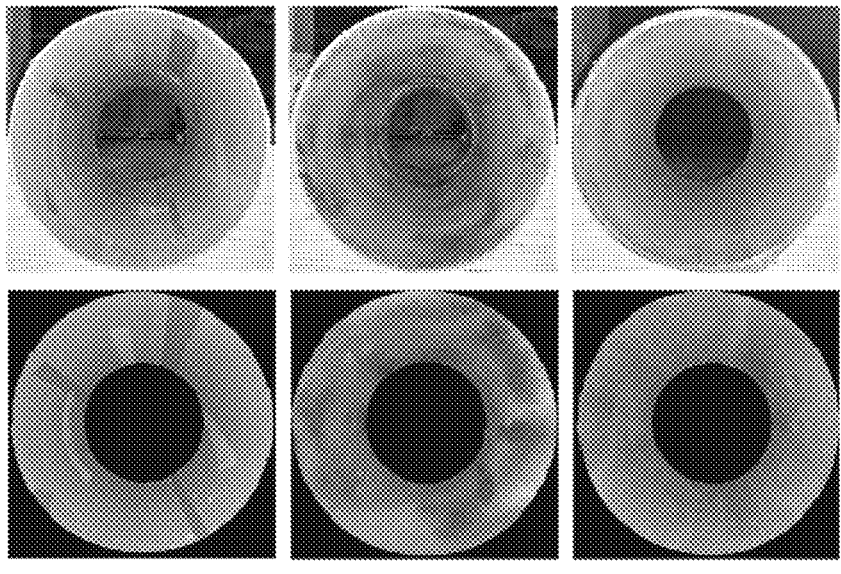

A qualitative comparison between the coarse and the fine registration results of the short pipe segments was performed. The fine registration showed better results when compared to the coarse registration for the three short pipes. Color-coded evaluation results favor fine registration methods in all three cases. In Table 1 below, the quantitative evaluation of the inter-camera registration is presented. Instead of only comparing the coarse and the fine registration, we further split the fine registration results with and without the calibration generalization. In general, the results show that the fine registrations reach one millimeter-level geometric accuracy and 0.1 intensity error of the photometric accuracy that outperforms the coarse registration results. Among the fine registrations, the generalized results present an average 5% improvement at the geometric accuracy and 2.5% increase on the photometric accuracy if the geometry of the inspected pipe is identical. Without the generalization, the method fails to generate the valid result on the steel pipe (c) due to the smaller pipe diameter as opposed to the calibration pipe. It is observed that the non-generalized calibrations present the better photometric result on the calibration pipe, which may be caused by the fact that the transformations are trained based on the marker map. To further assess the accuracy of the registration, we compare the radius of the unified pipe model (from the generalized fine registration) to the ground truth. As presented in Table 2, below, the error of the radius between the estimated and the ground truth reach at the one-millimeter level even for the steel pipes, which validates the accuracy of the presented method. In FIG. 9(b), we also validated the fidelity of the projected center camera by comparing the rendered color images with the images taken by a handhold monocular camera. Even though the intrinsic and extrinsic parameters of the cameras are different, the results present a good agreement between the real and the virtual scenes. The results showed the potential of integrating the proposed method into the existing pipe NDE studies where most algorithms are developed for in-pipe images taken from a front-viewed camera.

TABLE 1

| | Evaluation of the registration errors at the selected pipe segments | | | | | | | |
|---|---|---|---|---|---|---|---|---|
| | $Error_{geo}$ (mm) | | | | $Error_{pho}$ (pixel) | | | |
| Method | Calibration Pipe | Pipe (a) | Pipe (b) | Pipe (c) | Calibration Pipe | Pipe (a) | Pipe (b) | Pipe (c) |
| Coarse Registration | 5.862 | 5.858 | 5.691 | 5.422 | 0.603 | 0.1590 | 0.1644 | 0.1893 |
| Fine Registration (Without generalization) | 1.245 | 1.149 | 1.164 | x | 0.306 | 0.1182 | 0.1563 | x |
| Fine Registration (With generalization) | 1.192 | 1.091 | 1.101 | 1.112 | 0.357 | 0.1158 | 0.1557 | 0.1431 |

TABLE 2

| | | | |
|---|---|---|---|
| Comparison of the registered pipe to the ground truth, unit in millimeter | | | |
| Pipe # | Ground Truth Radius | Measured Radius (Median) | Measured Error [Mean, Std] |
| Calibration pipe | 175.8 | 176.55 | [0.753, 0.645] |
| Pipe (a) | 175.8 | 176.61 | [0.809, 0.782] |
| Pipe (b) | 175.8 | 176.83 | [0.987, 0.681] |
| Pipe (c) | 169.3 | 168.02 | [1.354, 1.108] |

Figure 10:
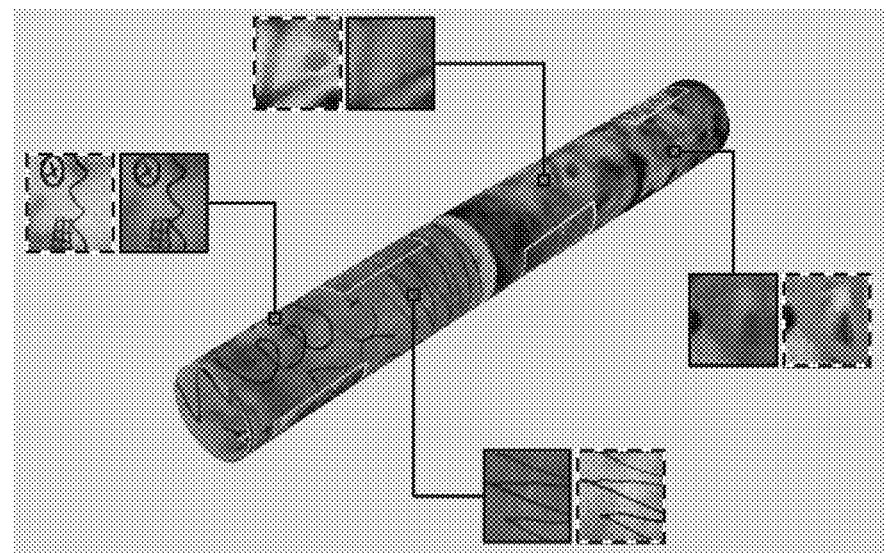
FIG. 10 is a 3D reconstruction in accordance with the disclosure.

FIG. 10 represents general and detailed views of 3D reconstruction of the long pipeline. High level matches are observed between the random patterns from the reconstructed dense point cloud model and the ground truths. Note the color variations between the reconstruction and the ground truth in the detailed views are caused by different lighting conditions. To assess the reconstruction accuracy using the attached pictures, the 3D pipeline model is unrolled where the A3 size prints attached at the internal pipe wall are flattened. Comparing to the ground truth (the 5 prints shown in FIG. 9), the textures in the pictures, representing the in-pipe corrosions, are recovered with high level-of-detail, validating the practicability of the proposed ILI system on pipe defects detection.

Table 3 demonstrates the accuracy of the reconstruction by comparing the point cloud measurement with the known length of the pipeline as well as the dimensions of the attached corrosion pictures. In general, we can achieve an approximate one millimeter-level accuracy with the absolute distance error less than 0.5% on the selected pipeline. These results demonstrate comparable accuracy performance to the Laser Profiling technique. However, the reconstructed models using our method are much denser, and the high-level details of the surface textures are preserved accurately. Among the five corrosion pictures, we found that both $p_2$ and $p_4$, where the average pixel intensities are larger (lighter-color images), contain relatively larger distance errors. We observe that these increased errors are primarily affected by the reflections from the onboard LEDs caused by the smooth surface of the printing papers. Because the robot motions are obtained purely from the RGBD images, the reconstruction accuracy is highly affected by the input images' quality. Improved performance can be expected from increased roughness to the internal wall surface of the pipelines and from an improved onboard illuminating device.

TABLE 3

| | | | | | |
|---|---|---|---|---|---|
| Evaluation of the in-pipe measurement as opposed to the ground truth | | | | | |
| Pipeline Segments | Location | Ground Truth (mm) | Measurement (mm) | Error (mm) | Abs Error (%) |
| α | $h_1$ | 268 | 268.4 | +0.4 | 0.15 |
| | $h_2$ | | 267.5 | −0.5 | 0.19 |
| | $w_1$ | 420 | 419.7 | −0.3 | 0.07 |
| | $w_2$ | | 421.8 | +1.8 | 0.43 |
| | $l_1$ | 1220 | 1222.7 | +2.7 | 0.22 |
| β | $h_3$ | | 267.3 | −0.7 | 0.26 |
| | $h_4$ | 268 | 269.2 | +1.2 | 0.45 |
| | $h_5$ | | 268.8 | +0.8 | 0.30 |
| | $w_3$ | | 420.5 | +0.5 | 0.12 |
| | $w_4$ | 420 | 418.9 | −1.1 | 0.26 |
| | $w_5$ | | 419.6 | −0.4 | 0.10 |
| | $l_2$ | 1580 | 1578.1 | −1.9 | 0.12 |

In the present disclosure, an ILI visual inspection method using DCA for single-pass, and related system, is described to acquire a full-coverage, dense 3D pipeline reconstruction. The developed camera calibration method allows reconstruction of the pipeline inline structure at millimeter or sub-millimeter geometric accuracy and at 0.1 pixel photometric accuracy. The achieved 0.5% distance error in reconstruction outperform many inline NDE applications.

The developed new visual inspection technology paves the way for low-cost and efficient ILI NDE for legacy pipelines as well as new pipelines, which is different from traditional ILI smart pigs that relies on specially designed and expensive pig-retrieval facilities/equipment. The high-fidelity and high-density reconstructed 3D models can potentially enable simultaneous visual detections of many types of pipelines defects such serious corrosion spots, pitting, cracks, deformations, etc., through a single inspection passage using the traveling rover.

There are several areas that can be further improved in future studies. First, the accuracy of the pipeline reconstruction is affected by the illumination conditions inside the pipelines. Further studies are needed to identify the optimal level of illumination for improved performance in different type of pipelines. Second, the performance of the proposed system is based on the test results from the straight pipe segments. Curved pipelines of various curvature values posed extra challenges to our method and need be addressed in future studies.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for inline inspection of a pipeline, the system comprising:

an inline vehicle comprising a frame and configured to transport the system along the pipeline;

a depth camera array (DCA) comprising plurality of RGBD cameras, the DCA disposed on an end of the frame, each of the plurality of RGBD cameras being mounted on sliding brackets of the frame that are configured to allow adjustment of a relative distance between each of the plurality of RGBD cameras, each of the plurality of RGBD cameras configured to rotate toward and away from an axis of symmetry of the pipeline;

a plurality of circular lights attached around the plurality of cameras and configured to illuminate inside the pipeline with diffuse light in a uniformly illuminated ring around the periphery of the pipe;

a controller disposed on the frame and operatively connected to the DCA; and an additional light disposed on the end of the frame and facing outward, wherein the plurality of RGBD cameras provide overlapping oblique views of an inner surface of the pipeline.

2. The system of claim 1, wherein the controller comprises:

a computing module that includes;

a sensing module that includes lights and is operably connected to the plurality of RGBD cameras and the additional camera; and a battery configured to power the computing module, the sensing module, the plurality of RGBD cameras, and the additional camera.

3. The system of claim 1, wherein the controller is operatively connected to the four wheels of the robot to control the transport of the system along the pipeline.

4. The system of claim 3, further comprising an actuator module disposed on the frame, the actuator module comprising:

electrical components configured to process and deliver power to drive the four wheels; and actuators configured to move the RGBD cameras relative to the frame.

5. The system of claim 1, wherein the inline vehicle comprises a pig.

6. The system of claim 1, wherein the inline vehicle comprises a robot, the robot comprising four wheels, each of the four wheels being adjustably attached to the frame and configured to move along a respective inclined axis relative to the frame, wherein the robot is configured to accommodate pipelines of different diameters by adjusting a position of at least a plurality of the four wheels, and wherein the four wheels are powered by the battery.

7. The system of claim 6, further comprising an actuator module that includes electrical components for processing and delivering power to drive the four wheels, actuators for moving the plurality of RGBD cameras relative to the frame, and is operatively connected to the computing module.

8. The system of claim 1, wherein each of the plurality of RGBD cameras comprises two infrared sensors.

9. The system of claim 1, wherein each of the plurality of RGBD cameras is disposed on a front end of the frame.

10. The system of claim 1, wherein each of the plurality of RGBD cameras is disposed on a back end of the frame.

11. The system of claim 1, wherein the DCA comprises between two and six RGBD cameras.

12. The system of claim 1, wherein the DCA comprises four RGBD cameras.

13. A method for reconstructing a digital 3D model of an interior surface of a pipeline, the method comprising:

calibrating a depth camera array (DCA);

preprocessing data from input videos from the calibrated DCA, the preprocessing comprising:

synchronizing the cameras of the DCA; and capturing data;

projecting a central camera;

applying visual odometry frame-to-frame, the applying visual odometry comprising:

computing initial transformations with colored iterative closest point;

optimizing camera poses, the optimizing comprising:

refining transformations with graph optimization;

querying successive frames reconstructing a 3D surface, the reconstructing comprising:

integrating images with a volumetric truncated signed distance function (TSDF); and outputting a mesh model.

14. The method of claim 13, wherein any measurement/sensor data used for the 3D pipe (line) surface reconstruction consists/comprises only (3D) image data acquired by (inline) image data collected by (the system).

15. The method of claim 13, wherein the (3D) image data acquired by (the system) is acquired in a single pass through the pipeline.

16. The method of claim 13 further comprising a single pass of the DCA along the pipeline.

17. A method for automated pipeline surface reconstruction, comprising:

synchronizing video sequences from a plurality of depth cameras using a temporal filter;

registering color and depth frames at each time stamp using a 3D lookup table;

outputting a sequence of time-stamped pipe point clouds collected as the plurality of depth cameras travels along a pipeline;

generating, for each pipe point cloud, a virtual front-viewed and center-positioned RGBD camera;

calculating a color/depth value at each pixel as the median of the neighbor points within a pre-defined distance;

converting input point clouds into a sequence of front-viewed RGBD images;

calculating motion of the plurality of cameras over time-stamps based on a rendered RGBD image sequence; and integrating the RGBD sequence with computed camera poses into a global system.

* * * * *